(12) United States Patent
Tantius

(10) Patent No.: US 6,357,564 B1
(45) Date of Patent: Mar. 19, 2002

(54) CONNECTION BEARING WITH A LINE CONNECTION

(75) Inventor: Andreas Tantius, Troisdorf (DE)

(73) Assignee: Mannesmann Sachs AG, Schweinfurt (DE)

( * ) Notice: Subject to any disclaimer, the term of this patent is extended or adjusted under 35 U.S.C. 154(b) by 0 days.

(21) Appl. No.: 09/492,900

(22) Filed: Jan. 27, 2000

(30) Foreign Application Priority Data

Feb. 3, 1999 (DE) .......................................... 199 04 206

(51) Int. Cl.[7] .................................................. F16F 9/00
(52) U.S. Cl. ............................... 188/321.11; 188/266.5; 267/64.12
(58) Field of Search ................... 267/64.12; 188/321.11, 188/266.5

(56) References Cited

U.S. PATENT DOCUMENTS

| | | | | |
|---|---|---|---|---|
| 4,367,968 A | * | 1/1983 | Ishida | 188/321.11 |
| 4,655,440 A | * | 4/1987 | Eckert | 188/266.5 |
| 4,989,698 A | * | 2/1991 | Dony | 267/64.12 |
| 5,794,742 A | * | 8/1998 | Lack et al. | 188/321.11 |
| 5,839,552 A | | 11/1998 | Vandewal et al. | 188/321.11 |
| 5,839,719 A | * | 11/1998 | Hosan et al. | 267/64.12 |

FOREIGN PATENT DOCUMENTS

| | | | | |
|---|---|---|---|---|
| DE | 4139940 | * | 6/1993 | 188/321.11 |
| DE | 42 33 650 | | 10/1993 | B60G/17/08 |
| DE | 44 38 384 | | 4/1996 | B60G/17/08 |
| DE | 197 37 935 | | 9/1998 | B60G/17/08 |
| JP | 5-10368 | | 1/1993 | F16F/9/32 |

* cited by examiner

*Primary Examiner*—Matthew Graham
(74) *Attorney, Agent, or Firm*—Cohen, Pontani, Lieberman & Pavane

(57) ABSTRACT

A connection bearing with a line connection comprises an annular bearing body with a through-opening which receives a bearing pin. The connection bearing has a receiving channel for receiving a line penetrating the connection bearing. The receiving channel is constructed at least up to the annular bearing body. Therefore, one end of the line can be grasped to hold it in a coaxial arrangement relative to the longitudinal axis of the connection bearing. The receiving channel in the bearing body for the line has an extension which extends along a direction that passes outside of the through-opening for the bearing pin.

9 Claims, 3 Drawing Sheets

CONNECTION BEARING WITH A LINE CONNECTION

BACKGROUND OF THE INVENTION

1. Field of the Invention

The invention is directed to a connection bearing with a line connection and a receiving channel for a line penetrating the connection bearing.

2. Description of the Related Art

A prior art connection bearing for a hydraulic vibration damper is disclosed in German reference DE 197 37 935 C1, which is provided with a connection eye for receiving a supply line that is guided through a hollow piston rod of the vibration damper. In addition, the connection eye has a radial access opening which extends virtually at right angles to the longitudinal axis of the hollow piston rod. The supply line is provided for linking to a sensor and accordingly has a small cross section.

The supply line is introduced through the hollow piston rod into the vibration damper during the final phase of mounting the vibration damper. The supply line is then threaded through the radial access opening out of the connection bearing. Subsequently, the connection bearing is screwed onto the piston rod. During the screwing movement, the supply line is twisted repeatedly. The loading occurring because of this is transmitted to the contacts in the vibration damper. Accordingly, it cannot be ruled out that the contacts of the supply line to the sensor will detach and proper functioning will no longer be ensured. Furthermore, it is necessary to take into account the relatively sharp bend at the transition between the line portion guided in the piston rod and the bent portion coming radially out of the access opening, which is detrimental to the service life of the supply line.

While the kink is made less sharp in the construction shown in FIG. 3 of German reference DE 42 33 650 C1, an additional line segment is used through the circumferential portion, which must be considered as wasted length.

SUMMARY OF THE INVENTION

It is the object of the present invention to provide a connection bearing for receiving a supply line which eliminates the assembly problems known from the prior art.

According to the present invention, this object is met by a connection bearing with a receiving channel constructed at least up to the bearing body of the connection bearing. Therefore, one end of the line may be grasped to hold it in a coaxial arrangement relative to the longitudinal axis of the connection bearing for assembly thereof. The receiving channel in the bearing body for the line has an extension which extends outside of the through-opening for the bearing pin.

The sharp kink known from the prior art described above is lessened because only a slight bend is necessary between the receiving channel and the extension to circumvent the through-opening for the bearing pin. A clamp which can move relative to the connection bearing to compensate for the turning movements necessary during assembly of the connection bearing suffices to hold the end of the line in the through-opening for the bearing pin.

In a further embodiment, the extension is constructed in a slot which extends over a portion of the circumferential direction of the bearing body. A first point along the slot overlaps with the receiving channel outside of the through-opening for the bearing pin in alignment with a projection of the longitudinal axis of the receiving channel. In this embodiment, particularly long lines can be guided out of the receiving channel. During assembly of the connection bearing, the line is held in the slot in the axial direction of the receiving channel. When the screwing movement in the connection bearing has been concluded, the line can be laid in the slot so as to be offset in the circumferential direction so that the line does not enter the pass-through area for the bearing pin.

To facilitate determination of the final assembly position of the line, a second point of the slot associated with the final assembly portion has a widened portion in which a locating piece or fixing piece for the line engages in a positive engagement.

In a further embodiment of the invention, both the first and second points of the slot have a widened portion in which a fixing piece for the line engages. Accordingly, the assembly position of the line can also be determined during the rotating movement of the connection bearing. Of course, the line can move relative to the connection bearing in the circumferential direction so that no twisting of the line occurs.

The intermediate or end point of the slot has a locking connection in relation to the fixing piece, so that the fixing piece retains its assembly position in the desired form.

To prevent moisture from penetrating via the receiving channel, this receiving channel is sealed relative to the line.

The connection bearing according to the present invention is provided as part of a piston-cylinder unit that has a concentric spring supported by its end at a spring plate which is a component part of the connection bearing. In addition, a cushion or buffer is fastened to the connection bearing and catches in an undercut of the bearing body.

To radially secure the buffer in a reliable manner, the connection bearing has a web or crosspiece which extends at least by segments in the circumferential direction and is formed at a defined distance from the connection buffer. The spring characteristic of the buffer can be influenced by the degree of the distance.

Given correspondingly large piece numbers, it is provided that the connection bearing is constructed as a cold-extruded part.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings.

In the drawings, wherein like reference characters denote similar elements throughout the several views

DETAILED DESCRIPTION OF THE PRESENTLY PREFERRED EMBODIMENTS

Figure 1:
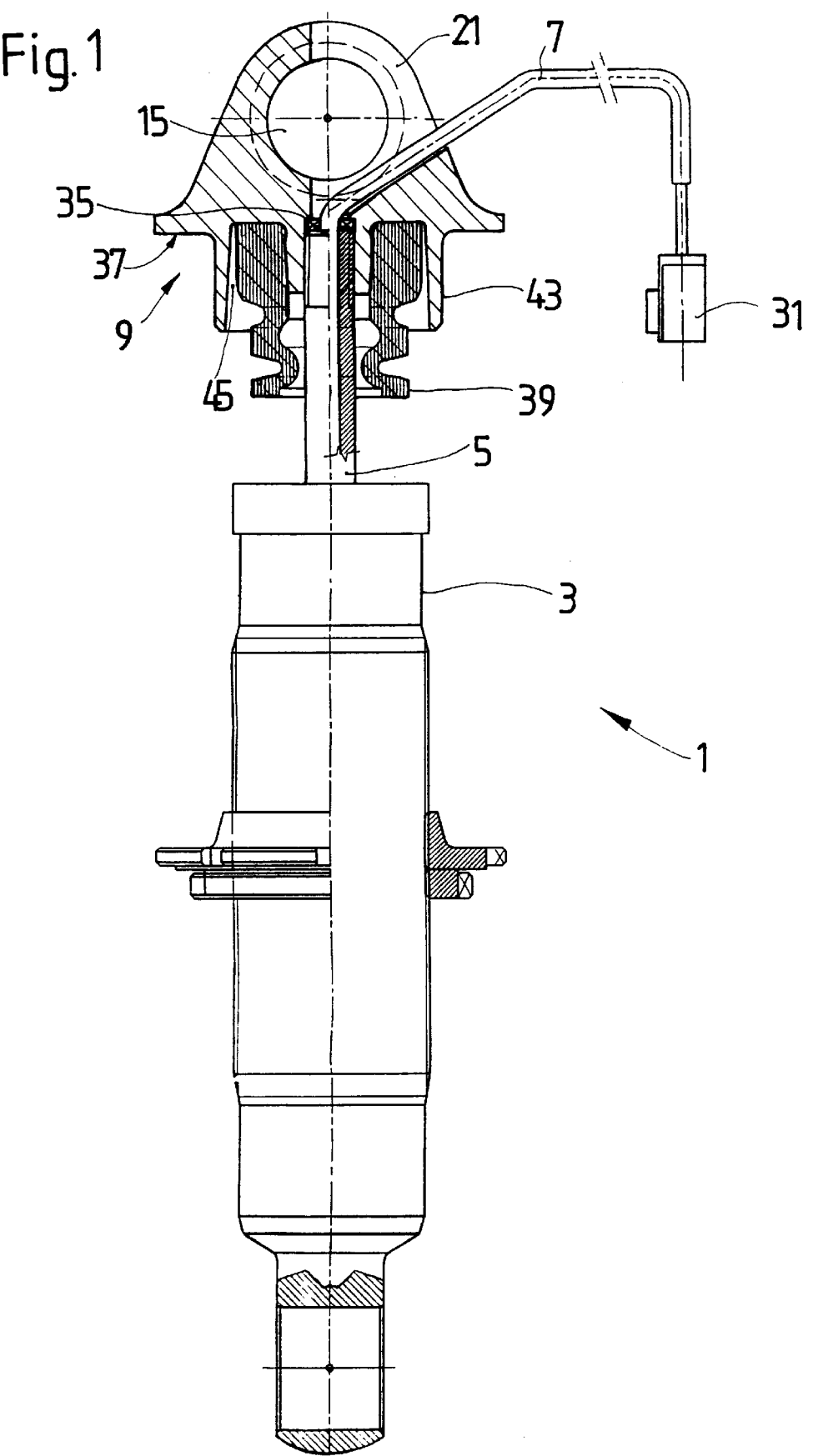
FIG. 1 is a partial longitudinal sectional view showing a connection bearing according to an embodiment of the present invention in combination with a piston-cylinder unit.

A piston-cylinder unit 1 with a cylinder 3 and a hollow piston rod 5 which is guided axially in the cylinder 3 is shown in FIG. 1. The piston-cylinder unit 1 may be used for a vibration damper, a pneumatic spring or any other type of adjusting element and further includes a line 7 through which a signal or power for an actuating element is transported electrically, pneumatically or hydraulically.

Figure 2:
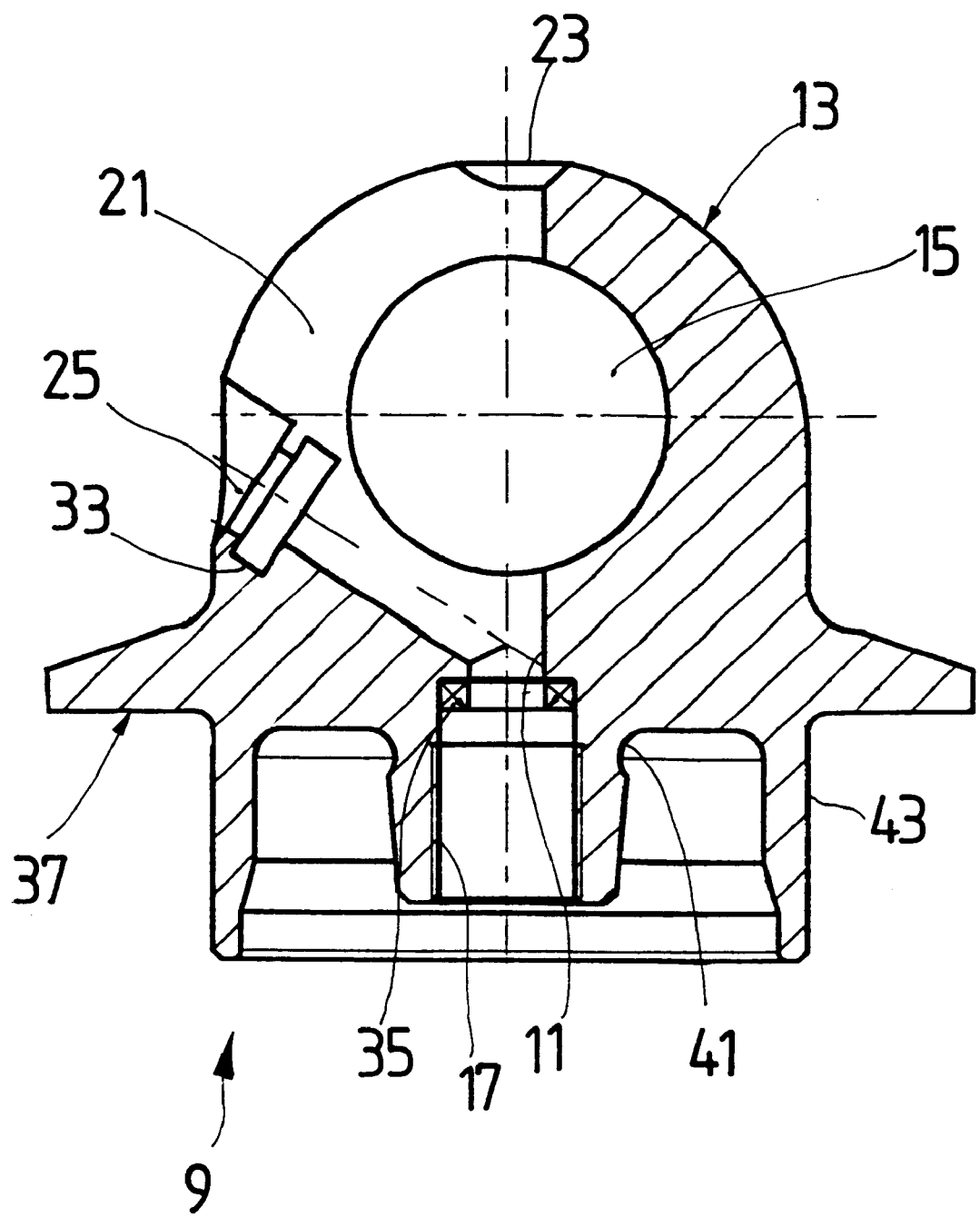
FIG. 2 is a more detailed sectional view a connection bearing according to an embodiment of the present invention.
Figure 3:
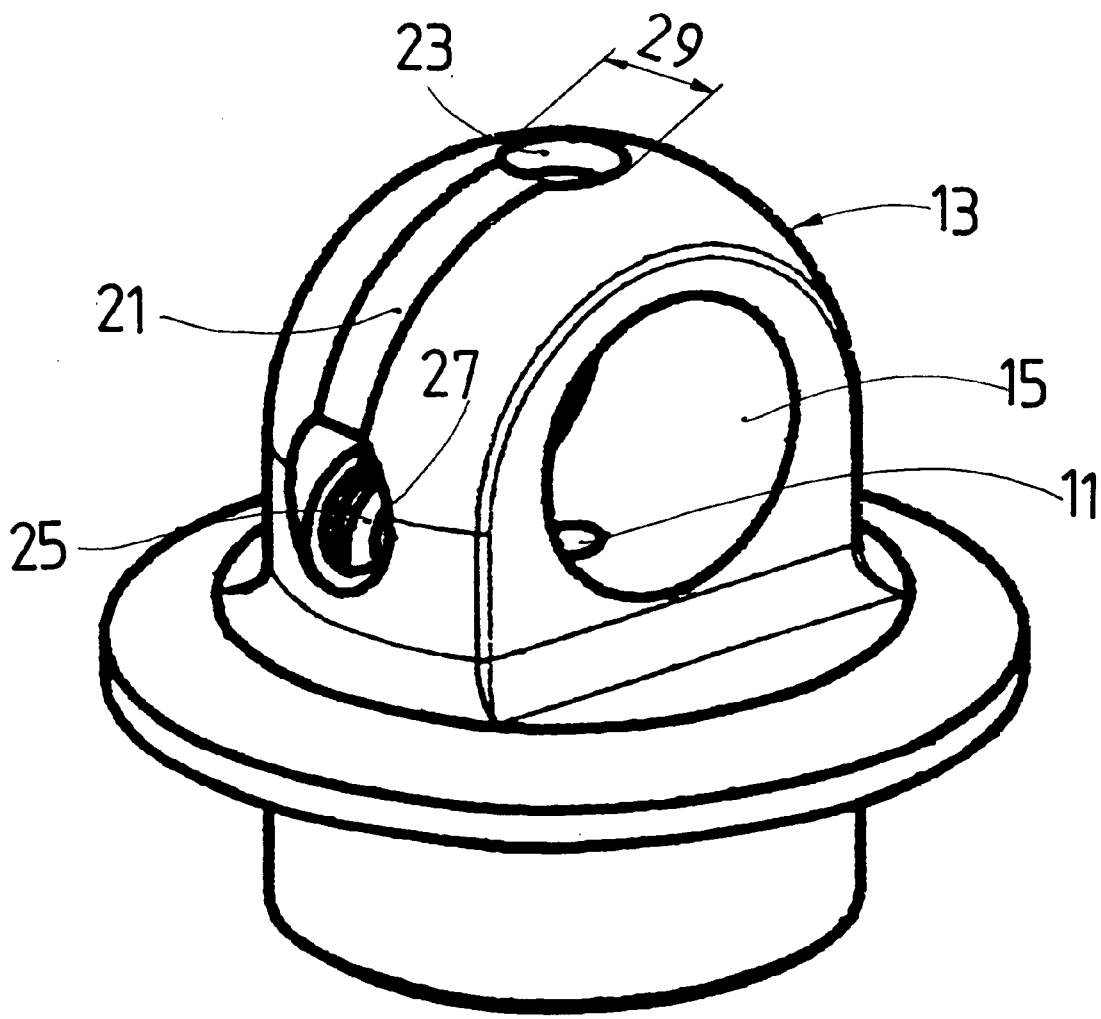
FIG. 3 is a raised perspective view of the connection bearing shown in FIG. 2.

Referring also to FIG. 2, a connection bearing 9 having a central receiving channel 11 for the line 7 is screwed on to the hollow piston rod 5. The central receiving channel 11 of the connection bearing 9 is constructed so that it is concentric to the hollow piston rod 5. Accordingly, the line 7 may pass out of the hollow piston rod 5 into the receiving channel 11 without kinking. The connection bearing 9 has an annular bearing body 13 in which a through-opening 15 for a bearing pin, not shown, is formed. The receiving channel 11 extends the length between the hollow piston rod 5 and the through-opening 15.

During assembly, the connection bearing 9 is connected with the hollow piston rod 5 via a fastening thread 17. In so doing, the end of the line 7 projects up to the through-opening 15. With the aid of a simple clamp, not shown, the end of the line 7 is held in the through-opening 15 during the screwing movement of the connection bearing 9. The clamp is then disconnected and the end of the line 7 is threaded into an extension 19 of the receiving channel 11, which extension 19 extends at an angle to the longitudinal axis of the piston cylinder unit 1.

For applications with lines 7 having longer ends, the extension 19 is provided with a slot 21. The slot 21 extends in the circumferential direction with respect to the through opening 15 of the annular bearing body 13. A first point 23 along the slot 21 is formed in alignment with a projection of the longitudinal axis of the receiving channel 11 so that the end of the line 7 may be guided out of the connection bearing 9 without kinking. A second point 25 along the slot 21 selected such that a path between the second point and the receiving channel 11 lies outside of the through-opening 15, i.e., in a final assembly position of the line 7.

The first and second points 23, 25 may be end points or intermediate points along the slot 21 and respectively have widened portions 27, 29 for receiving a fixing piece 31 for the line 7 (see FIG. 1). The fixing piece 31 is engageable in either of the two widened portions 27, 29 a positive engagement. Accordingly, two positions of the line 7 can be reliably determined by e fixing piece 31 without additional tools.

In a first assembly step, the line 7 is threaded through the receiving channel 11 into the through-opening 15 up to the slot 21 at the first point 23 and is held there by the fixing piece 31. While not mandatory, the fixing piece 31 does facilitate assembly. The connection bearing 9 is then screwed onto the hollow piston rod 5. The screwing-on movement has no effect on the line 7. The fixing piece 31 is then disengaged from first point 23 and the line 7 is displaced along the slot 21 until the line 7 is aligned with the second point 25. At this position, the fixing piece 31 is allowed to catch in a pull-relief connection 33 aligned with the second point 25. The position of second point 25 ensures that the line 7 extends outside of the area of the through-opening 15. To prevent moisture from penetrating into the hollow piston rod, a seal 35 is arranged between the end face of the hollow piston rod 5 and the connection bearing 9.

There are numerous applications in which a spring is arranged concentric to the piston-cylinder unit 1, e.g., spring struts in a motor vehicle. For this purpose, the connection bearing 9 has a spring plate 37 which is formed integral with the annular bearing body 13. Further, a buffer 39 (see FIG. 1) may also be used, which buffer 39 catches in an undercut 41 of the connection bearing 9. The buffer 39 contacts the cylinder 3 when the hollow piston rod 5 nears its insertion limit in the cylinder 3. In addition, the connection bearing has a web 43 which extends at least in segments around the circumferential direction and which is constructed at a defined distance 45 from the buffer 39. The distance 45 is not required to be constant. In fact, a conical inner contour of the web 43 may be used to enable a deliberate change in the spring rate or spring constant of the buffer.

With correspondingly high piece numbers, the connection bearing 9 is constructed as a cold-extruded part.

The invention is not limited by the embodiments described above which are presented as examples only but can be modified in various ways within the scope of protection defined by the appended patent claims.

I claim:

1. A connection bearing having a longitudinal axis, said connection bearing being connectable to a device and comprising a line connection for receiving a line which penetrates said connection bearing, said connection bearing comprising:

an annular bearing body having a through-opening for receiving a bearing pin;

a receiving channel in said annular bearing body operatively arranged for receiving the line, wherein said receiving channel is coaxial relative to the longitudinal axis of said connection bearing; and an extension of the receiving channel extending through said annular bearing and outside of said through-opening, said extension comprising a slot which extends along a circumferential direction of said bearing body, wherein one of an intermediate point and an end point of said slot is aligned with a projection of said longitudinal axis through said through-opening, wherein the line is receivable in said extension, the line being arrangeable at said one of an intermediate point and an end point during mounting of said bearing body and wherein the line is movable in said slot to a position outside the area of said through-opening.

2. The connection bearing of claim 1, further comprising a widening of said slot at said first point for receiving a fixing piece for the line in a positive engagement.

3. The connection bearing of claim 2, wherein said slot comprises a second point such that the line is aligned with said second point when said line extends through said extension, wherein said first and second points of said slot have widening in which a fixing piece for the line engages.

4. The connection bearing of claim 3, further comprising a locking connection at said second point of said slot in relation to the fixing piece.

5. The connection bearing of claim 1, wherein said receiving channel comprises a seal for sealing the line receivable therein.

6. The connection bearing of claim 1, wherein said connection bearing comprises part of a piston-cylinder unit with a concentric spring that is supported by its end at a spring plate, wherein said spring plate comprises a component part of said connection bearing.

7. The connection bearing of claim 1, wherein said annular bearing body comprises an undercut and said connection bearing further comprises a buffer fastened to said connection bearing so that it catches in said undercut of said annular bearing body.

8. The connection bearing of claim 7, wherein said connection bearing comprises a web that extends segmentally in the circumferential direction and is formed at a defined distance from said buffer.

9. The connection bearing of claim 1, wherein said connection bearing comprises a cold-extruded part.

* * * * *